United States Patent

Strasser et al.

[11] Patent Number: 6,158,570
[45] Date of Patent: Dec. 12, 2000

[54] PROCESS AND DEVICE FOR CONVEYING AND FORMING GROUPS OF DISCOID PRODUCTS, IN PARTICULAR BISCUITS

[75] Inventors: Thomas Strasser, Benken; Theo Walz, Neunkirch, both of Switzerland

[73] Assignee: SIG Pack Systems AG, Beringen, Switzerland

[21] Appl. No.: 09/171,920

[22] PCT Filed: Apr. 18, 1997

[86] PCT No.: PCT/CH97/00154

§ 371 Date: Oct. 29, 1998

§ 102(e) Date: Oct. 29, 1998

[87] PCT Pub. No.: WO97/41034

PCT Pub. Date: Nov. 6, 1997

[30] Foreign Application Priority Data

Apr. 29, 1996 [SE] Sweden ................................ 1073/96

[51] Int. Cl.[7] .................................................. B65G 29/00
[52] U.S. Cl. ............................................................ 198/450
[58] Field of Search ......................... 198/418.9, 419.2, 198/462.1, 462.2, 450

[56] References Cited

U.S. PATENT DOCUMENTS 3,084,783  4/1963  Etal .......................................... 198/450
4,238,025  12/1980  Manservisi ............................... 198/450
4,562,916  1/1986  Filter ....................................... 198/450
5,035,315  7/1991  Fukusaki et al. ..................... 198/419.2

FOREIGN PATENT DOCUMENTS 2421630  11/1974  Germany .
641416  2/1984  Switzerland .
664126  2/1988  Switzerland .

*Primary Examiner*—Robert P. Olszewski
*Assistant Examiner*—Bryan Jaketic
*Attorney, Agent, or Firm*—Venable; George H. Spencer; Ashley J. Wells

[57] ABSTRACT

The products (12) are delivered in a plurality of columns (11) to a conveyor wheel (15) which has pivotably articulated carriers (26, 27). An axially stationary carrier (26) and an axially displaceable carrier (27) are alternately coordinated with every two input columns (11) in the direction of conveyance (A). Said two columns (11) are delivered at different heights according to the carrier distance. During conveyance into the output station (16), the displaceable carriers (27) are moved into the trajectory plane of the others with the result that common groups (18) of products (12) lying to be flat on each other are formed from two input columns (11). The device substantially avoids relative motion between products (12) and guides with the result that the products (12) are handled carefully.

9 Claims, 3 Drawing Sheets

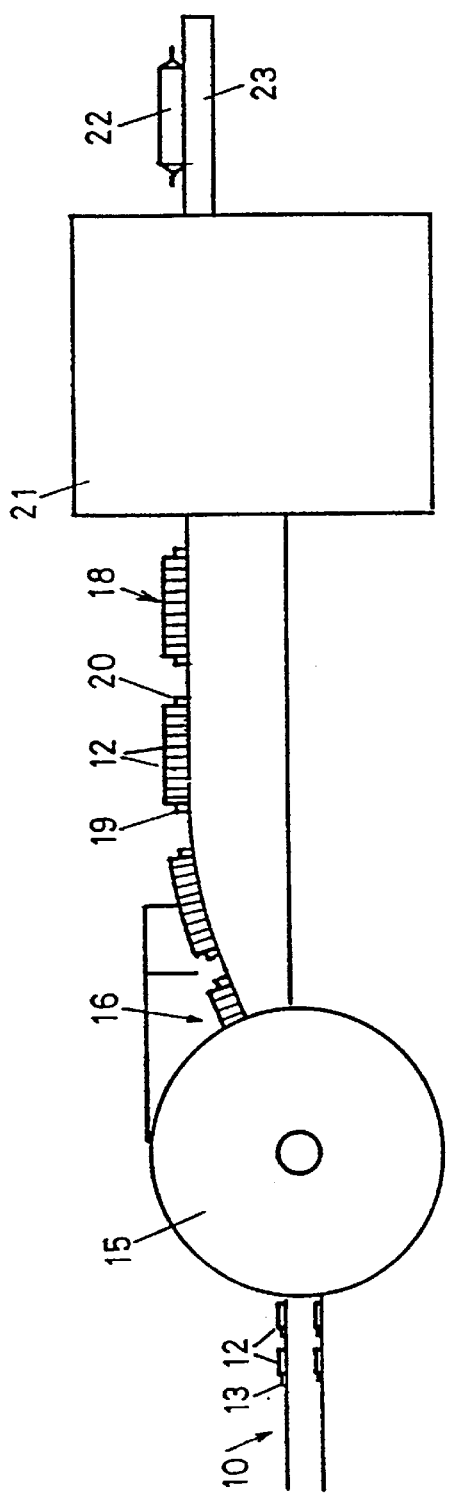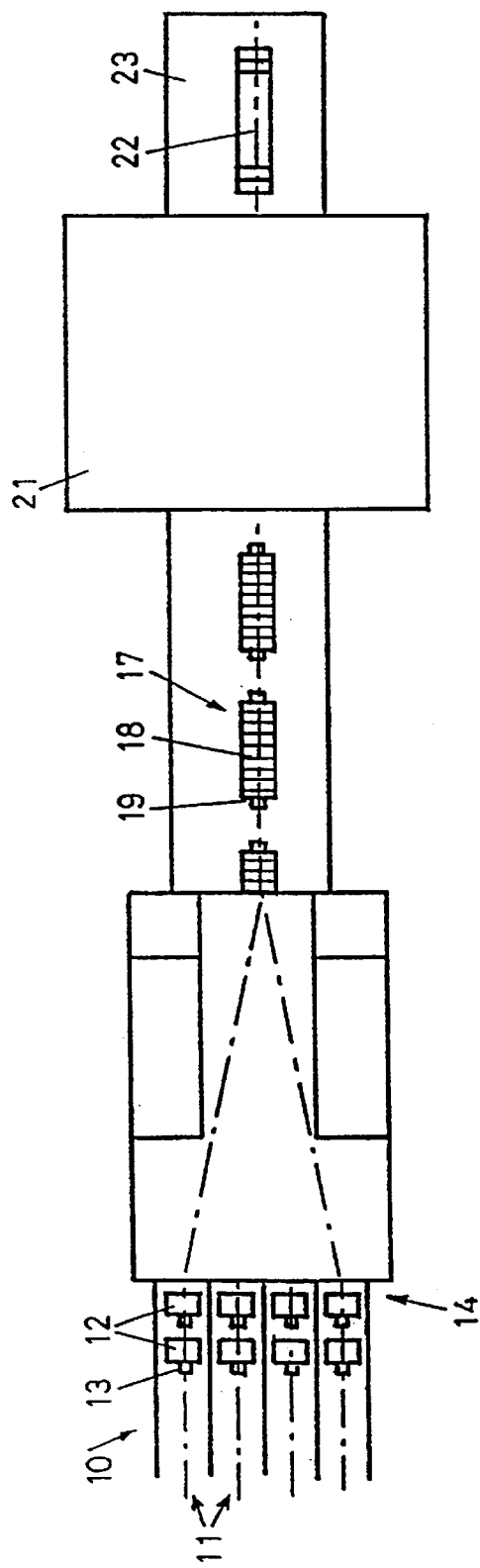

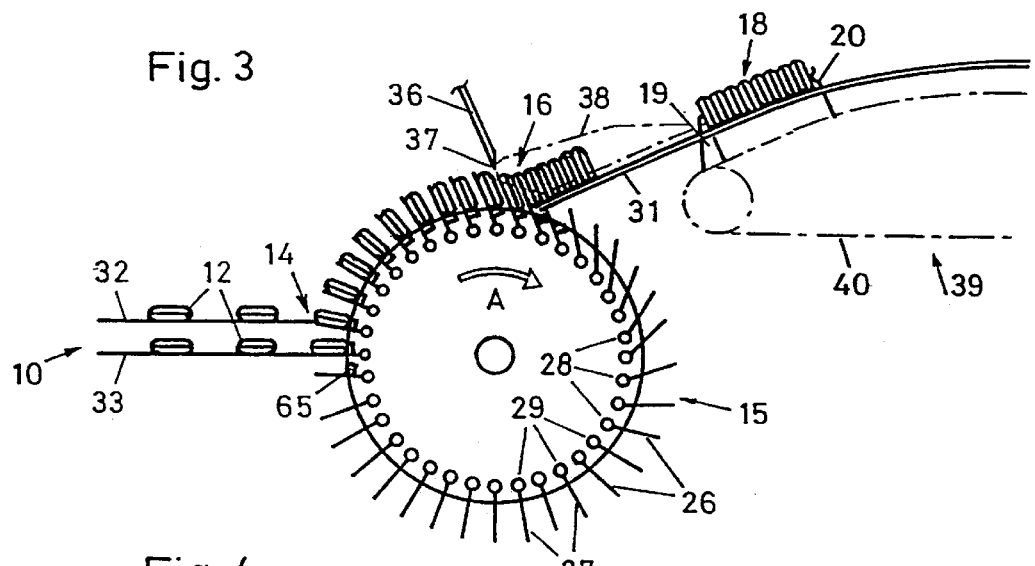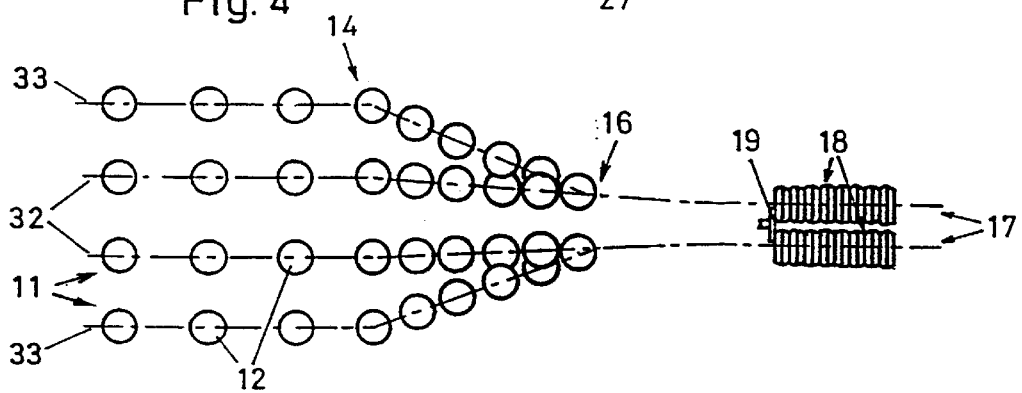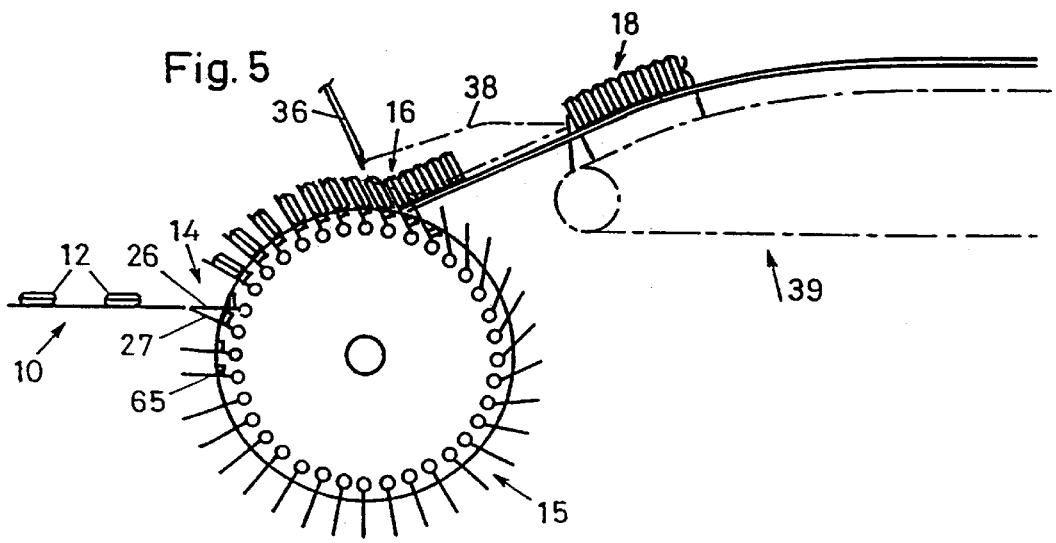

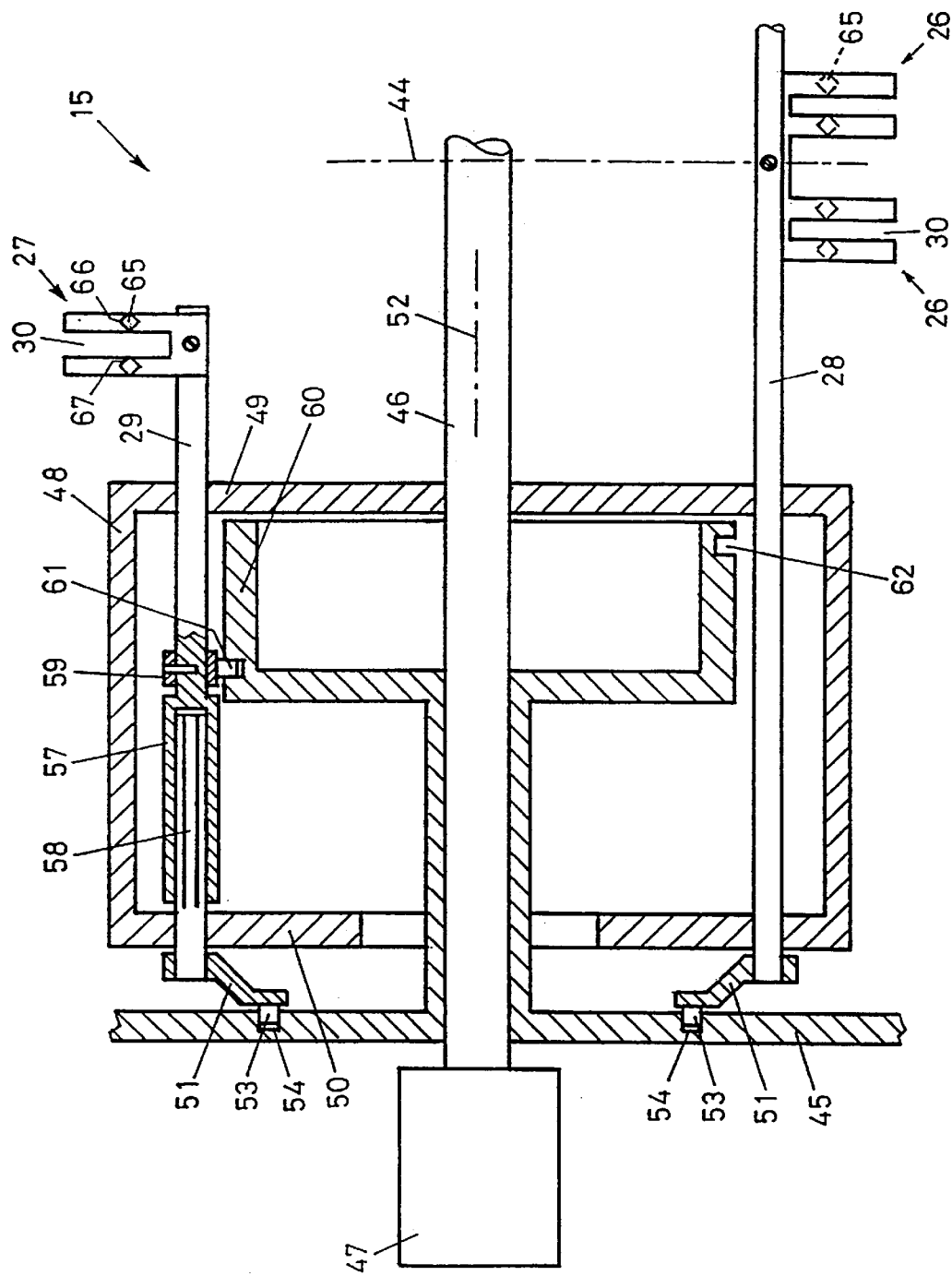

PROCESS AND DEVICE FOR CONVEYING AND FORMING GROUPS OF DISCOID PRODUCTS, IN PARTICULAR BISCUITS

The preambles to claims 1 and 2 of CH-PS 641 416 describe a method and apparatus for transporting and grouping biscuits. The biscuits are delivered in a plurality of columns and transferred to carriers of a conveyor wheel. The carriers can pivot on the wheel. They push the biscuits through guides in an output station, in which groups of flat-sided biscuits resting against each other are formed on further guides, the biscuits being transported further by means of a slide that is moved periodically. The sliding of the biscuits in the guides causes abrasion. A similar apparatus is described in CH-PS 664 126.

It is the object of the present invention to provide a method and an apparatus of this type, in which the relative movements between the products and guides is minimized, so the products are handled carefully. This object is accomplished by the combination of features in the claims.

Embodiments of the invention are described below in conjunction with the drawings. Shown are in:

FIGS. 1 and 2 a schematic side view and a plan view, respectively, of the apparatus, FIGS. 3 and 4 a representation of a variation that is slightly more detailed in comparison to FIGS. 1 and 2, respectively, FIG. 5 a representation of a further variation corresponding to FIG. 3, and FIG. 6 one half of an axial section through the conveyor wheel.

In the embodiment according to FIGS. 1 and 2, four columns 11 of discoid products 12 are delivered at regular intervals by, for example, slides 13. In an input station 14, they are transferred to a transport wheel 15. In the input station 14, the four adjacent tracks of the conveyor 10 are disposed at different heights. As the products 12 are transported in the wheel 15 to the output station 16, they are pushed together, forming a single output column 17. In the output station 16, groups 18 of flat-sided, adjacent products 12 are formed, which are supplied with slides 19 and counterholders 20 to a packaging machine 21. The groups 18 are packaged in the machine 21. The finished packages 22 are transported away on a conveyor 23.

In the variation according to FIGS. 3 and 4, two output columns 17 are formed from four input columns 11. Carriers 26, 27, which are uniformly distributed over the circumference at the periphery of the wheel 15, are secured to pivot about pivoting shafts 28, 29. The carriers 26, 27 have radial slots 30 that are open toward the outside (FIG. 6). In the output station 16, a guide sheet 31, which supports the lower edge of the products 12, extends into these slots 30. The carriers 26, 27 are oriented radially in the input station 14, and are pivoted back toward the output station 16, so they are oriented approximately perpendicular to the sheet 31 there, which slopes upward at a flat angle of about 15°. As the wheel 15 rotates further, the carriers are withdrawn between adjacent products 12 of the forming groups 18, and are subsequently radially oriented again. The two outermost carrier columns are offset with respect to the two center columns by the spacing of the carriers 26, 27. The two center supply tracks 32, 33 of the supply conveyor 10 are also offset by this amount with respect to the two outer tracks 33. The outermost carriers 27 on the wheel 15 are laterally displaceable. During the transport movement from the station 14 to the station 16, they are displaced into the plane of circulation of the other carriers 26, so groups 18 of products 12 are formed from two adjacent input columns 11 in the output station 16.

From the output station 16, the groups 18 are first pushed out by a slide 36, which is disposed virtually perpendicular to the sheet 31; the face end 37 of this slide circulates in a circulation track 38 such that, after a predetermined number of products 12 in the forming group 18, it dips into the slot 30 of the relevant carrier 26, 27 and, simultaneously, is advanced synchronously with the circulating speed of the carriers 26, 27 in the direction of the sheet 31 in the station 16. The course of the movement and the means for moving the slide 36 can be embodied, for example, in accordance with CH-PS 641 416. As an alternative, the slide 36 could be secured to two synchronously-driven chains that are offset from one another and circulate on a respective track corresponding to the track 38. From the slide 36, the group 18 is transferred to a further conveyor 39 having a circulating chain 40, to which the slides 19 and counterholders 20 are secured.

In the variation according to FIG. 5, all of the supply tracks 32, 33 are at the same level. To accomplish this, in the input station 14, the respectively outer carrier 27 is pivoted up such that its face ends are aligned with the face ends of the immediately-preceding two center carriers 26.

FIG. 6 shows one half of an axial section through the wheel 15. The other half of the wheel 15 is mirror-symmetrical with respect to the center plane 44. The drive shaft 46 of the wheel 15 is seated to be rotatable and axially non-displaceable in a frame 45. The drive shaft is driven by a motor 47. A tubular support 48 having radial flanges 49, 50 is connected to the shaft 46 so as to be fixed against relative rotation and axial displacement. The pivoting shafts 28 for the center carriers 26 are secured in the flanges 49, 50 to be rotatable and axially non-displaceable. The two center carriers 26 are screwed to the shafts 28. A lever arm 51, whose free end supports a roller 53 seated to rotate parallel to the axis 52 of the shaft 46, is rigidly secured to one end of the shaft 28. The roller 53 runs in a groove-like guide curve 54, which controls the pivoting movement of the carriers 26, 27. The other shaft 29, to which an outer carrier 27 is secured, is seated to be rotatable and axially non-displaceable in the flange 49. At the other end, it changes over to a wedge sleeve 57, into which a multi-splined shaft 58 that is rotatably seated in the flange 50 extends in a manner fixed against relative rotation. Secured to the other end of this shaft is a further lever arm 51 with a roller 53, which runs in the guide curve 54. A guide shoe 59 is secured to the shaft 29 to pivot, but not to be axially displaced. The shoe 59 has a concave surface, which rests against the outer circumference of a cylinder 60 secured to the housing. A roller 61 that extends into a groove-like guide curve 62 in the outer surface of the cylinder 60 is rotatably seated at the shoe 59. The curve 62 controls the axial movement of the carriers 27.

All of the carriers 26, 27 have stops 65 whose stop edge 66 is oriented radially outward, and whose stop surface 67 is oriented toward the other stop 65 of the same carrier 26, 27. During operation, with rectangular products, one face end of the products 12 impacts the edges 66 and, with round products, a face end impacts surfaces 67. Thus, the products 12 are guided reliably during the lateral displacement without necessitating additional guide elements. This facilitates the format conversion.

The apparatus permits careful handling of the products. The relative movements between products and guide elements are reduced. The apparatus has a high output. Format conversions are possible in a simple manner. The apparatus has a small space requirement, and functions reliably. The line reduction with good overview capability is possible in a simple manner.

What is claimed is:

1. A method of transporting groups of discoid products which are supplied flat in a plurality of input columns to a conveying means having pivotable carriers and, while standing on end, are conveyed by the conveying means to an output station, in which groups of flat-sided products resting against each other are formed, with the groups being further transported by means of a collecting slide, characterized in that consecutive carriers of the conveying means are loaded with products, from at least two adjacently-supplied input columns, and that one of the consecutive carriers is displaced laterally during the advancing movement of the conveying means in order to form common groups from the at least two input columns in the output station.

2. An apparatus for executing the method according to claim 1, encompassing a supply conveyor for supplying a plurality of input columns of discoid products, a conveying means having pivotable carriers for transporting the products from an input station, in which the products can be pushed from the supply conveyor onto the carriers, into an output station, in which groups of flat-sided, adjacent products are formed, as well as a collecting slide for further transporting the groups, characterized in that at least two columns of carriers are disposed, offset from one another in the conveying direction, on the conveying means, and, during the transport from the input station to the output station, the carriers of at least the one carrier column can be displaced transversely to the transport direction by displacement means for forming common groups from the at least two output columns in the output station.

3. The apparatus according to claim 2, wherein the conveying means encompasses a rotatable wheel, at whose periphery the carriers are hinged, and with the at least two input columns being offset from one another in the conveying direction of the conveying means at the input station.

4. The apparatus according to claim 2, wherein each carrier has at least one stop, against which the periphery of the products rests.

5. The apparatus according to claim 4, wherein each carrier has two spaced stops, which preferably have a stop edge for one edge of a rectangular product, and a stop surface, which faces the other stop, for round products.

6. The apparatus according to claim 2, wherein each carrier has a slot, through which collecting means extend in the output station.

7. The apparatus according to claim 2, wherein carriers that are laterally non-displaceable and laterally displaceable follow alternatingly in the conveying direction.

8. The apparatus according to claim 2, wherein the collecting slide has virtually the same transport direction as the input columns.

9. The apparatus according to claim 2, wherein the conveying direction of the collecting slide slopes upward at the output station (16) and is subsequently horizontal.

* * * * *